US012776631B2

(12) United States Patent
Cisewski

(10) Patent No.: US 12,776,631 B2
(45) Date of Patent: Oct. 27, 2026

(54) POWER DISTRIBUTION BOX

(71) Applicant: Jody Cisewski, Carlsbad, CA (US)

(72) Inventor: Jody Cisewski, Carlsbad, CA (US)

(*) Notice: Subject to any disclaimer, the term of this patent is extended or adjusted under 35 U.S.C. 154(b) by 264 days.

(21) Appl. No.: 18/587,685

(22) Filed: Feb. 26, 2024

(65) Prior Publication Data

US 2024/0291255 A1 Aug. 29, 2024

Related U.S. Application Data

(60) Provisional application No. 63/448,603, filed on Feb. 27, 2023.

(51) Int. Cl.

| | |
|---|---|
| ***H02G 3/03*** | (2006.01) |
| ***H01R 13/70*** | (2006.01) |
| ***H01R 25/00*** | (2006.01) |
| ***H02G 3/08*** | (2006.01) |
| ***H02J 3/14*** | (2026.01) |

(52) U.S. Cl.
CPC ............... *H02G 3/03* (2013.01); *H01R 13/70* (2013.01); *H01R 25/00* (2013.01); *H02G 3/083* (2013.01); *H02G 3/086* (2013.01); *H02J 3/14* (2013.01)

(58) Field of Classification Search
CPC .......... H02G 3/03; H02G 3/083; H02G 3/086; H02J 3/14; H01R 13/70; H01R 25/00
See application file for complete search history.

(56) References Cited

U.S. PATENT DOCUMENTS

| | | | | |
|---|---|---|---|---|
| 5,430,598 | A * | 7/1995 | Rodolfo | H01H 47/001 361/115 |
| 5,742,466 | A * | 4/1998 | Kram | H01R 25/00 361/111 |
| 8,106,541 | B1 * | 1/2012 | Sarullo | H01R 25/006 307/139 |
| 2007/0006603 | A1 * | 1/2007 | Reusche | G01K 3/00 62/196.4 |
| 2011/0043034 | A1 * | 2/2011 | Pien | H02J 3/14 307/38 |
| 2017/0018925 | A1 * | 1/2017 | Emby | H02J 3/14 |
| 2017/0125984 | A1 * | 5/2017 | Mergener | H02J 13/00022 |
| 2017/0154387 | A1 * | 6/2017 | Somers | G06Q 50/06 |
| 2021/0273418 | A1 * | 9/2021 | Stier | H02B 1/52 |
| 2021/0328390 | A1 * | 10/2021 | Hansen | H01R 13/73 |

* cited by examiner

*Primary Examiner* — Menatoallah Youssef
*Assistant Examiner* — Rasem Mourad
(74) *Attorney, Agent, or Firm* — CP LAW GROUP PC; Cy Bates

(57) ABSTRACT

A power distribution box is disclosed. The power distribution box includes one or more continuous-powered receptacles and a plurality of power-alternating receptacles. The continuous-powered receptacle is in a constant energized state during operation of the power distribution box. At least one of the plurality of power-alternating receptacles is in a de-energized state during operation of the power distribution box at any instance while at least one of the plurality of power-alternating receptacles is in an energized state at any instance. The power distribution box disclosed herein allows for electronic devices that should remain constantly on to be electrically coupled to the one or more continuous-powered receptacles, and for electronic devices that don't require constant power to be electrically coupled to the plurality of power-alternating receptacles in order to control power consumption and prevent electrical overload.

16 Claims, 8 Drawing Sheets

115

POWER DISTRIBUTION BOX

CROSS-REFERENCE TO RELATED APPLICATIONS

This application claims benefit of priority with U.S. Provisional Application Ser. No. 63/448,603, filed Feb. 27, 2023; the entire contents of which are hereby incorporated by reference.

BACKGROUND

Field of the Invention

This disclosure relates to a power distribution box, and more particularly to a power distribution box comprising a plurality of power-alternating receptacles.

Description of the Related Art

A power distribution box is a device commonly used to safely distribute electricity from a power source to other devices on the circuit. In the water damage restoration industry, the power distribution box is an economical way to distribute electrical power to a room where various equipment is required. Equipment for drying a room can include dehumidifiers and multiple air movers.

Oftentimes the power requirements for the equipment in the room exceeds the available power in the room. Current solutions include using extension cords to connect to other rooms or to a power source outside the home. This creates safety risks and privacy concerns including trip hazards. Doors to rooms are unable to close which can be especially problematic where a bathroom is being used as a power source. Additionally, the home is more susceptible to intrusion where the power source is exterior to the house.

There is a need for a power distribution box that allows a water damaged room to power all necessary drying equipment without the need to access power sources exterior the room.

SUMMARY

A power distribution box is disclosed. The power distribution box comprises one or more continuous-powered receptacles and a plurality of power-alternating receptacles. The continuous-powered receptacle is in a constant energized state during operation of the power distribution box. At least one of the plurality of power-alternating receptacles is in a de-energized state during operation of the power distribution box at any instance while at least one of the plurality of power-alternating receptacles is in an energized state at any instance. Generally, each of the plurality of power-alternating receptacles are configured to alternate between the energized state and the de-energized state.

The power distribution box disclosed herein allows for electronic devices that should remain constantly on to be electrically coupled to the one or more continuous-powered receptacles, and for electronic devices that don't require constant power to be electrically coupled to the plurality of power-alternating receptacles in order to control power consumption. In one embodiment, a dehumidifier can continuously while multiple air movers can operate on a rotational basis to dry a room while utilizing an outlet of said room without electrical overload.

BRIEF DESCRIPTION OF THE DRAWINGS

Other features, combinations, and embodiments will be appreciated by one having the ordinary level of skill in the art of power distribution boxes upon a thorough review of the following details and descriptions, particularly when reviewed in conjunction with the drawings, wherein.

DETAILED DESCRIPTION

Figure 1:
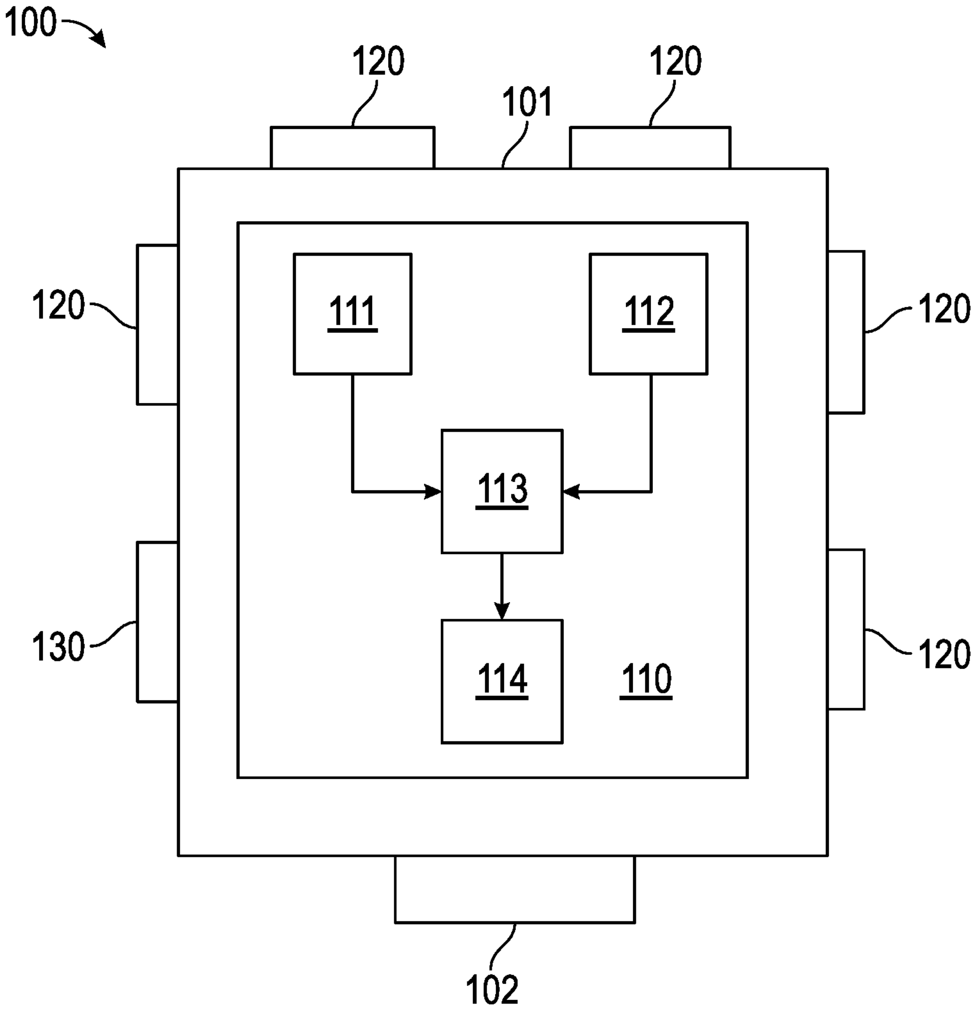
FIG. 1 shows a block diagram view of a power distribution box in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, the term "receptacle" means any contact device for connection of electronic devices by means of a plug and may include conventional receptacles, twist-lock connectors, camlock connectors, and other connecting elements that can be appreciated by one having skill in the art.

The term "energized state" means capable of transmitting power to the electronic device coupled therewith.

The term "de-energized state" means incapable of transmitting power to the electronic device coupled therewith.

The term "air movers" means devices design to move and circulate air thin a space to improve air quality, dry surfaces, and provide ventilation. Air movers can include fans, blowers, ventilator, and the like.

Unless explicitly defined herein, terms are to be construed in accordance with the plain and ordinary meaning as would be appreciated by one having skill in the art.

General Description of Embodiments

In one embodiment, a power distribution box is disclosed. The power distribution box comprises a housing having a periphery and one or more continuous-powered receptacles and a plurality of power-alternating receptacles externally disposed on the periphery housing. The one or more continuous-powered receptacles are continuously in an energized state during operation of the power distribution box. Each of the plurality of power-alternating receptacles is configured to independently alternate between the energized state and a de-energized state during operation of the power distribution box. At least one of the plurality of power-alternating receptacles is in the de-energized state at any instance, and further wherein at least one of the plurality of power-alternating receptacles is in the energized state at any instance. The power distribution box further comprises a power switching module encapsulated within the housing. The power switching module comprises a programmable configuration control, a programmable timing control, power switching componentry, and a microcontroller. The programmable configuration control is configured to receive user programmable input from a first actuator and a second actuator for configuration of the plurality of power-alternating receptacles. The programmable timing control is configured to receive user programmable input from a third actuator and a fourth actuator for timing of the plurality of power-alternating receptacles. The power switching componentry is configured to regulate both configuration and timing of the plurality of power-alternating receptacles based on the user programmable input for configuration and the user programmable input for timing, and the microcontroller is electrically coupled to each of the programmable configuration control, the programmable timing control, and the power switching componentry such that the microcontroller is configured to receive signals from the programmable configuration control and the programmable timing control, the microcontroller further configured to send a signal to the power switching componentry to put each of the plurality of power-alternating receptacles into either the energized state or the de-energized state. A power inlet is disposed on the housing, the power inlet being electrically coupled to each of the one or more continuous-powered receptacles and the plurality of power-alternating receptacles.

In some embodiments, each of the first through fourth actuators may comprise switches. In some, each of the first through fourth actuators may be disposed within the housing.

In another embodiment, a power distribution box is disclosed. The power distribution box comprises a housing having a periphery, one or more continuous-powered receptacles, and a plurality of power-alternating receptacles. The one or more continuous-powered receptacles are disposed on the housing, wherein the one or more continuous-powered receptacles are continuously in an energized state during operation of the power distribution box. The plurality of power-alternating receptacles is disposed on the housing, wherein each of the plurality of power-alternating receptacles is configured to alternate between the energized state and a de-energized state during operation of the power distribution box.

In some embodiments, the power distribution box may further comprise a power inlet disposed on the housing, the power inlet electrically coupled to each of the one or more continuous-powered receptacles and the plurality of power-alternating receptacles.

In some embodiments, at least one of the plurality of power-alternating receptacles is in the de-energized state at any instance. At least one of the plurality of power-alternating receptacles may further in the energized state at any instance.

In some embodiments, the one or more continuous-powered receptacles and the plurality of power-alternating receptacles each may be externally accessible.

In some embodiments, each of the plurality of power-alternating receptacles may be configured to independently alternate between the energized state and the de-energized state.

In some embodiments, the power distribution box may further comprise a power switching module encapsulated within the housing, the power switching module configured to alternate the plurality of power-alternating receptacles between the energized state and the de-energized state.

In some embodiments, the power switching module may further comprise a programmable configuration control configured to receive user programmable input for configuration of the plurality of power-alternating receptacles, a programmable timing control configured to receive user programmable input for timing of the plurality of power-alternating receptacles, power switching componentry configured to regulate both configuration and timing of the plurality of power-alternating receptacles based on the user programmable input for configuration and the user programmable input for timing, and a microcontroller electrically coupled to each of the programmable configuration control, the programmable timing control, and the power switching componentry such that the microcontroller is configured to receive signals from the programmable configuration control and the programmable timing control, the microcontroller further configured to send a signal to the power switching componentry to put each of the plurality of power-alternating receptacles into either the energized state or the de-energized state.

In some embodiments, the power switching module may further comprise a programmable configuration control and a programmable timing control, the programmable configuration control comprising a first actuator and a second actuator, and the programmable timing control comprising a third actuator and a fourth actuator. Each of the first through fourth actuators may comprise switches. Each of the first through fourth actuators may be disposed within the housing.

In some embodiments, configuration and timing of the plurality of power-alternating receptacles may be programmable by a user.

In some embodiment, each of the one or more continuous-powered receptacles and the plurality of power alternating receptacles may be disposed on the periphery of the housing.

In another embodiment, a power distribution system is disclosed. The power distribution system comprises a dehumidifier and a plurality of air movers electrically coupled to a power distribution box. The power distribution box comprises a housing having a periphery, one or more continuous-powered receptacles, and a plurality of power-alternating receptacles. The one or more continuous-powered receptacles are disposed on the housing, wherein the one or more continuous-powered receptacles are continuously in an energized state during operation of the power distribution box. The plurality of power-alternating receptacles is disposed on the housing, wherein each of the plurality of power-alternating receptacles is configured to alternate between the energized state and a de-energized state during operation of the power distribution box. A power inlet is disposed on the housing, the power inlet electrically coupled to each of the one or more continuous-powered receptacles and the plurality of power-alternating receptacles. The dehumidifier is electrically coupled to one of the one or more one or more continuous-powered receptacles. The plurality of air movers is electrically coupled to the plurality of power-alternating receptacles, wherein each of the plurality of air movers is configured to alternate between on and off states.

In some embodiments, at least one of the plurality of power-alternating receptacles is in the de-energized state at any instance. At least one of the plurality of power-alternating receptacles may further in the energized state at any instance.

In some embodiments, the one or more continuous-powered receptacles and the plurality of power-alternating receptacles each may be externally accessible.

In some embodiments, each of the plurality of power-alternating receptacles may be configured to independently alternate between the energized state and the de-energized state.

In some embodiments, the power distribution box may further comprise a power switching module encapsulated within the housing, the power switching module configured to alternate the plurality of power-alternating receptacles between the energized state and the de-energized state.

In some embodiments, the power switching module may further comprise a programmable configuration control configured to receive user programmable input for configuration of the plurality of power-alternating receptacles, a programmable timing control configured to receive user programmable input for timing of the plurality of power-alternating receptacles, power switching componentry configured to regulate both configuration and timing of the plurality of power-alternating receptacles based on the user programmable input for configuration and the user programmable input for timing, and a microcontroller electrically coupled to each of the programmable configuration control, the programmable timing control, and the power switching componentry such that the microcontroller is configured to receive signals from the programmable configuration control and the programmable timing control, the microcontroller further configured to send a signal to the power switching componentry to put each of the plurality of power-alternating receptacles into either the energized state or the de-energized state.

In some embodiments, the power switching module may further comprise a programmable configuration control and a programmable timing control, the programmable configuration control comprising a first actuator and a second actuator, and the programmable timing control comprising a third actuator and a fourth actuator. Each of the first through fourth actuators may comprise switches. Each of the first through fourth actuators may be disposed within the housing.

In some embodiments, configuration and timing of the plurality of power-alternating receptacles may be programmable by a user.

In some embodiment, each of the one or more continuous-powered receptacles and the plurality of power alternating receptacles may be disposed on the periphery of the housing.

Each of the components of the power distribution box and related system described herein may be manufactured and/or assembled in accordance with the conventional knowledge and level of a person having skill in the art.

While various details, features, combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

Illustrated Embodiments

Describe each figure in detail, using reference numbers when mentioned first time in a paragraph Now turning to the drawings, FIG. 1 shows a block diagram view of a power distribution box (100) in accordance with a first illustrated embodiment. The power distribution box comprises a housing (101) having a power switching module (110) encapsulated therein. The power switching module includes a programmable configuration control (111), a programmable timing control (112), at least one microcontroller (113), and power switching componentry (114). The power distribution box further comprises a continuous-powered receptacle (130) and a plurality of power-alternating receptables (120). Both the continuous-powered receptacle and the plurality of power-alternating receptacles are electrically coupled to a power input (102) of the power distribution box and both are externally accessible for providing power to a myriad of electronic devices.

Power from a source exterior to the power distribution box (100) travels through the power input (102) to provide power to both the continuous-powered receptacle (130) and the plurality of power-alternating receptacles (120). The continuous-powered receptacle is continuously in an energized state to continuously provide power to an electronic device coupled therewith. Each of the plurality of power-alternating receptacles are configured to independently alternate between an energized state and a de-energized state during operation of the power distribution box. Alternating between the energized state and the de-energized state is achieved by the power switching module (110).

The power switching module (110) is configured to alternate states of each of the plurality of power-alternating receptables (120) between the energized state and the de-energized state. The microcontroller (113) receives one or more signals from both the programmable configuration control (111) and the programmable timing control (112). Based on said one or more signals, the microcontroller sends instructions to the power switching componentry (114) to put each of the plurality of power-alternating receptacles into either the energized state or de-energized state with a power configuration and a timing based on the programmable configuration control and the programmable timing control, respectively.

Both the programmable configuration control (111) and the programmable timing control (112) are configured to receive a selection by a user for the power configuration and the timing. The power configuration designates which of the plurality of power-alternating receptacles (120) are in the energized state at any given time. The timing designates how long each of the plurality of power-alternating receptacles remain in said energized state.

In one embodiment, the power configuration may comprise only one of the plurality of power-alternating receptables (120) being in the energized state at one time. For example, with five power-alternating receptacles designated A-E, receptacle A is initially in an energized state along with the continuous-powered receptacle (130) while receptacles B-E are in a de-energized state. After the timing has lapsed, receptacle A changes to the de-energized state to match receptacles C-E while receptacle B changes to the energized state with the continuous-powered receptacle. After each respective lapse of the timing, receptacles C, D, E each take their respective turn as the power-alternating receptacle in the energized state with the continuous-powered receptacle after which the power configuration is repeated again with receptacle A.

In another embodiment, the power configuration may comprise at most two of the power-alternating receptacles (120) being in an energized state at any given time. For example, with five power-alternating receptacles designated A-E, receptacles A and B are in the energized state along with the continuous-powered receptacle (130) while receptacles C, D, E remain in a de-energized state. After the timing has lapsed, receptacles A and B change to the de-energized state to match receptacle E and receptacles C and D change from the de-energized state to the energized state. After the timing has lapsed, receptacles C and D change back to the de-energized state and receptacle E and A change from the de-energized state to the energized state.

In another embodiment, the power configuration may comprise at most three of the power-alternating receptacles (120) being in the energized state at any given time. For example, with five power-alternating receptacles designated A-E, receptacles A, B, and C are in the energized state along with the continuous-powered receptacle (130) while receptacles D and E remain in a de-energized state. After the timing has lapsed, receptacles A, B, and C change to the de-energized state and receptacles D and E change from the de-energized state to the energized state. After the timing has lapsed, receptacles C and D change back to the de-energized state and receptacles A, B, and C return to the energized state for the power configuration to repeat the cycle. Alternatively, receptacles A, B, C can initially be in the energize state with receptacles A and B switching to the de-energized state and receptacles D and E switching to the energized state such that receptacles C, D, and E are then in the energized state. Receptacles C and D could turn off and receptacles A and B could turn back on such that receptacles E, A, and B are in the energized. Subsequently, receptacles E and A could de-energized and receptacles C and D could turn on such that receptacles B, C, and D and then in the energized state.

In another embodiment, the power configuration may comprise a pattern of receptacle A and B being simultaneously in the energized state while receptacles C, D, and E are in the de-energized state. After the timing has lapsed, receptacles A and B are de-energized and only receptacle C is subsequently energized. After the timing has lapsed, receptacle C is de-energized and only receptacle D is energized. After the timing has lapsed, receptacle D is de-energized and only receptacle E is energized. After the timing has lapsed the power configuration can restart with receptacles A and B.

In another embodiment, the power configuration may comprise at most two of the power-alternating receptacles (120) being in the energized state at any given time wherein changes in state occurs serially. For example, with five power-alternating receptacles designated A-E, receptacles A and B are in an energized state while C, D, and E are in the de-energized state. After the timing has lapsed, receptacle A changes to the de-energized stated while receptacle B remains in the energized state. Receptacle C then changes to the energized state along with receptacle B. After the timing lapses again, receptacle B changes to the de-energized state while receptacle C remains in the energized state. Receptacle D then changes to the energized state along with receptacle C. The power of configuration continues from DE to EA and then returns again to AB.

The continuous-powered receptacle (130) is configured to power an electronic device that is desirable to remain on during the entire operation of the power distribution box. For uses with water damage restoration, a dehumidifier is preferred to remain in operation at all times while drying a room. The dehumidifier couples to the continuous-powered receptacle and each of a plurality of air movers couple to one of the plurality of power-alternating receptacles (120). The plurality of air movers would then alternate between on and off states based on the power switching module (110) and more particularly to the programmable configuration control (111) and the programmable timing control (112). The alternating operation of the air movers allows air in the room to continuously move for the dehumidifier to capture moisture while allowing the power distribution box (110) to power all devices using a single power outlet contained within the room.

Figure 2:
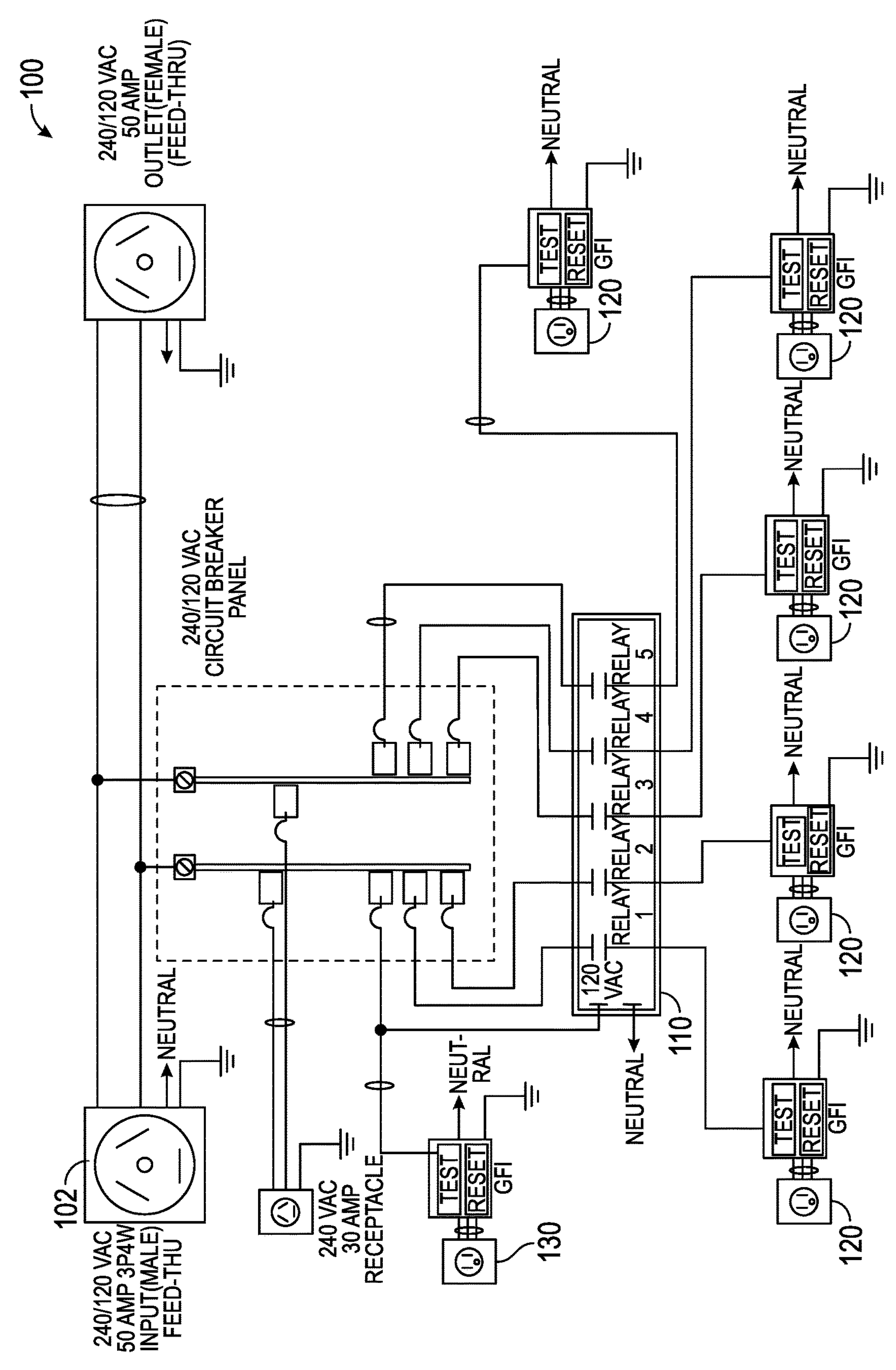
FIG. 2 shows a schematic view of the power distribution box according to the first illustrated embodiment.

FIG. 2 shows a schematic view of the power distribution box (100) according to the first illustrated embodiment. The power distribution box comprises a power inlet (102) configured to receive power from an external source. The power travels through a circuit breaker (103) to ensure protection from a variety of electrical failures including overcurrent, overload, and short circuits. The power then is transferred to both a continuous-powered receptacle (130) and a power switching module (110). The continuous-powered receptacle remains in an energized state during operation of the power distribution box. The power switching module is electrically coupled to a plurality of power-alternating receptacles (120). The power switching module is configured to independently send power to each of the plurality of power-alternating receptacles based on settings of the power distribution box. The settings can either be programmable by a user or preset by the manufacturer.

Figure 3A:
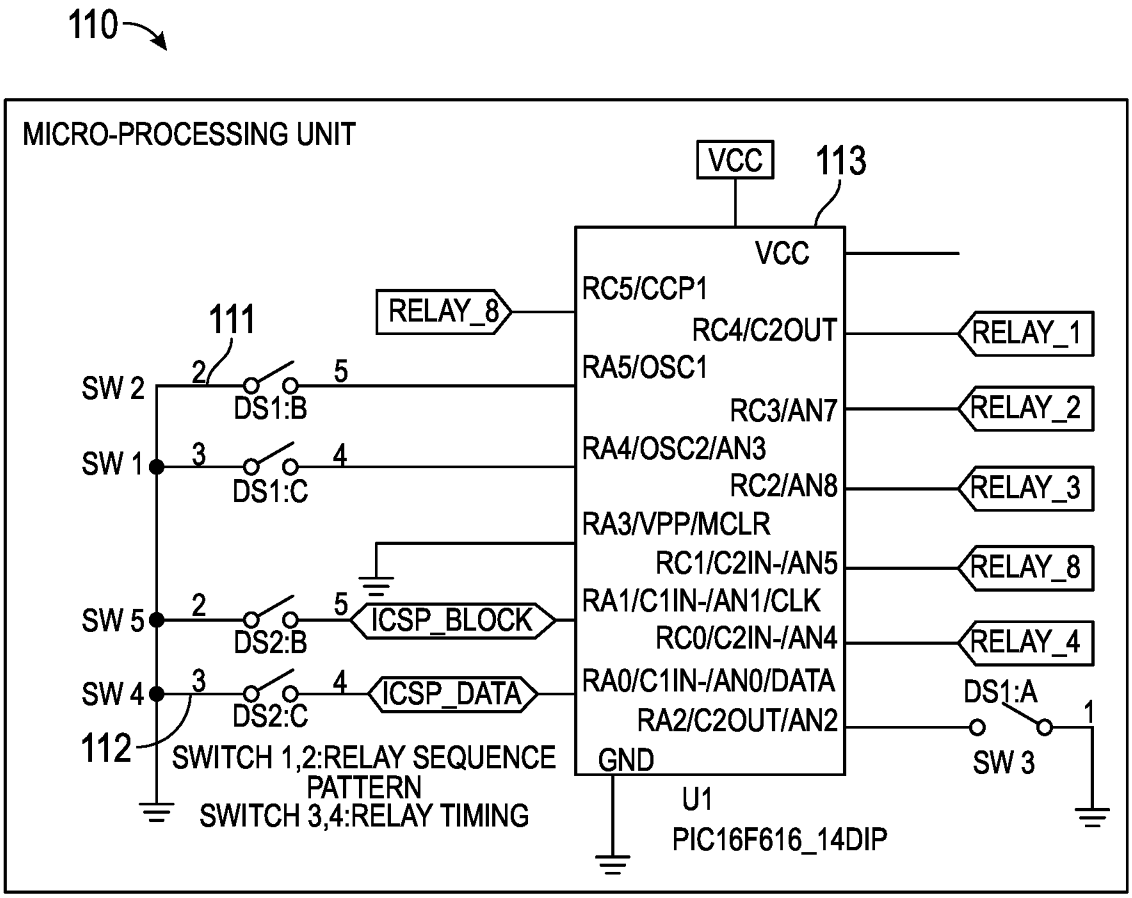
FIG. 3A shows a schematic view of a power switching module according to the first illustrated embodiment.
Figure 3B:
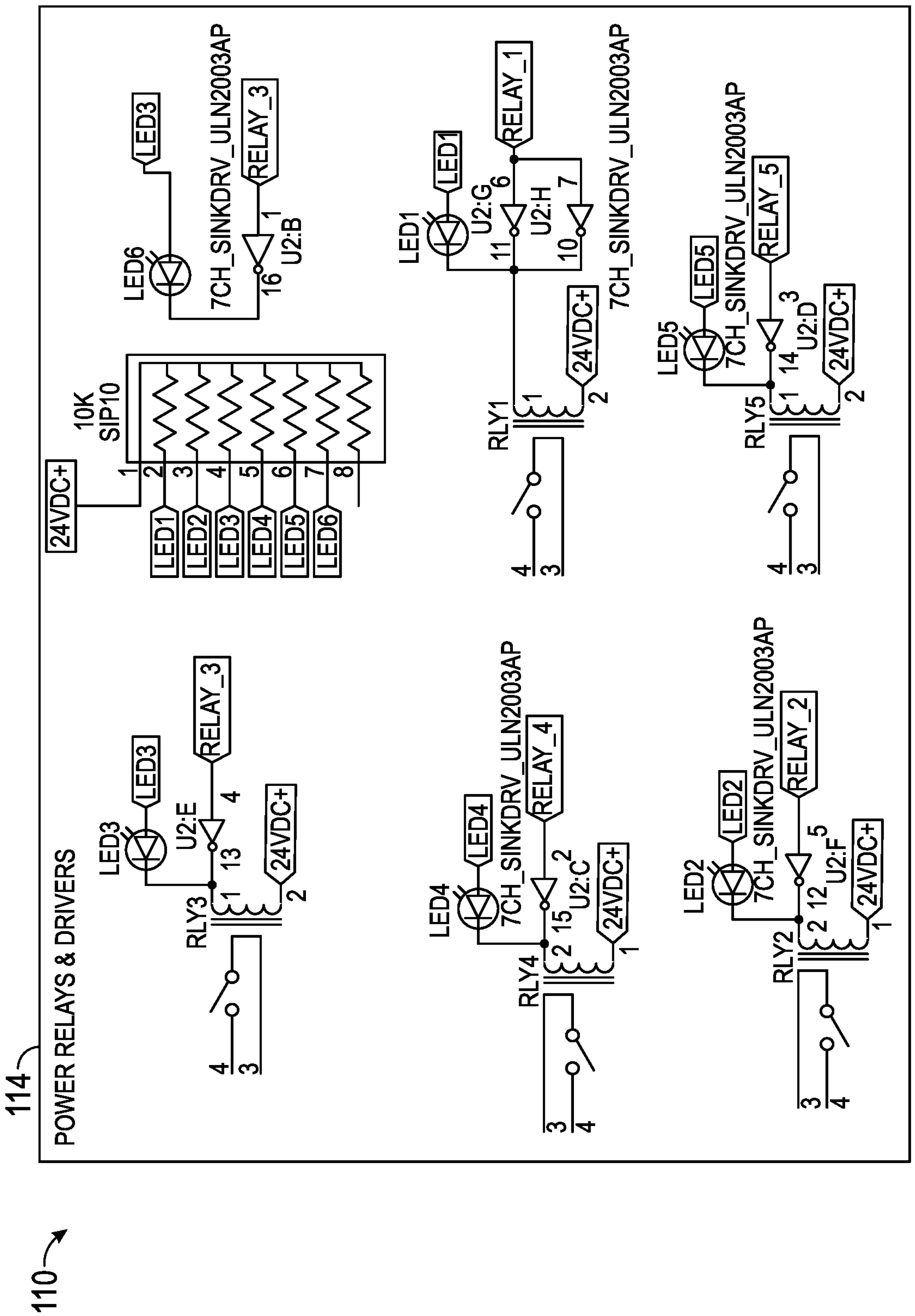
FIG. 3B shows an alternate schematic view of the power switching module according to the first illustrated embodiment.
Figure 3C:
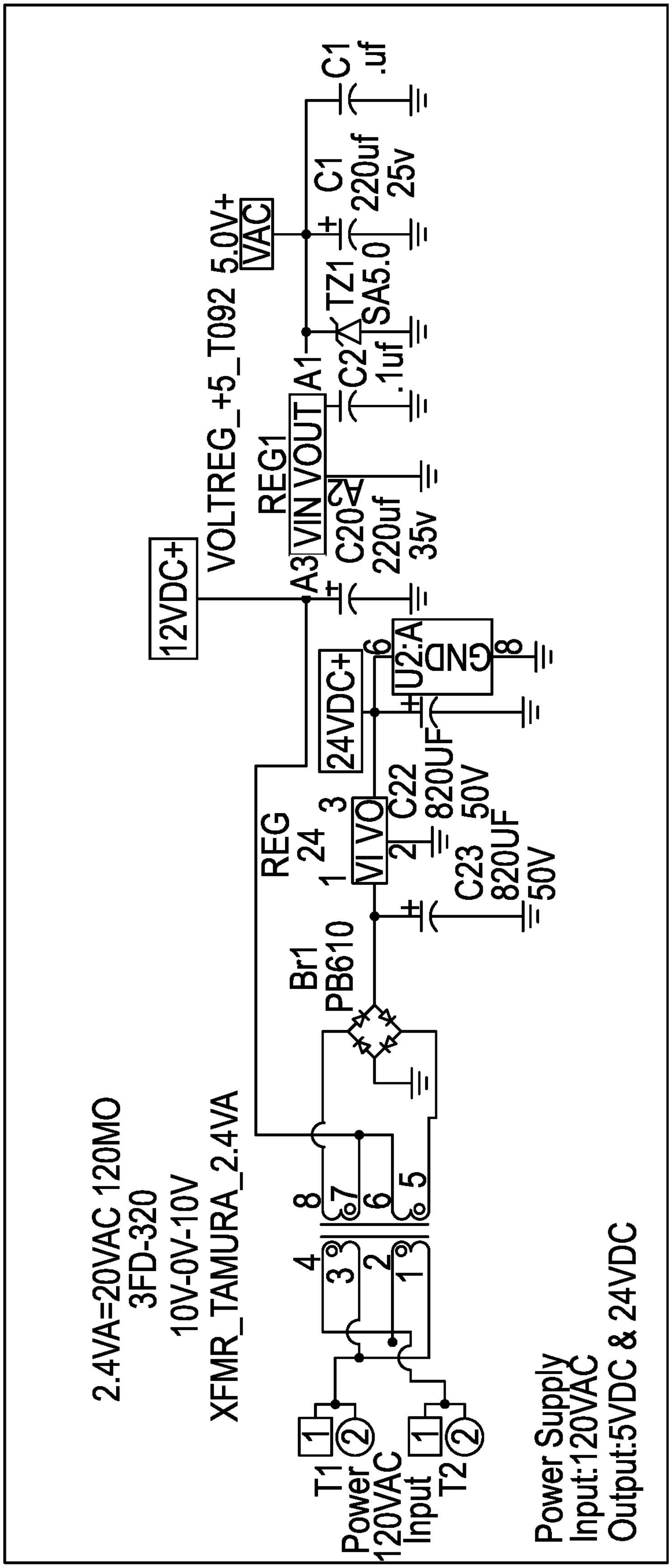
FIG. 3C shows yet another alternative schematic view of the power switching module according to the first illustrated embodiment.

FIG. 3A-3C shows a schematic view of a power switching module (110) according to the first illustrated embodiment. The power switching module includes a programmable configuration control (111) and a programmable timing control (112) each electrically coupled to a microcontroller (113). Based on settings of both the programmable configuration control and the programmable timing control, the microcontroller is configured to control a power configuration and timing with a power switching circuitry (114). Power from a power supply (115) of the power switching module is then directed to at least one of the power-alternating receptacles (120).

The programmable configuration control (111) and the programmable timing control (112) are shown with switches to allow a user to choose from preselected settings. The programmable configuration control comprises a first switch and a second switch allowing for up to four settings for the power configuration. The programmable timing control comprises a third switch and a fourth switch allowing for up to four settings for the timing. An example can include one minute, two minutes, four minutes, and eight minutes.

The power switching componentry (114) comprises power relays and drivers. Other componentry can be used instead of or in addition to the illustrated embodiment including MOSFETs, transistors, thyristors, and/or any other components as can be appreciated by one having skill in the art for controlling power.

Figure 4:
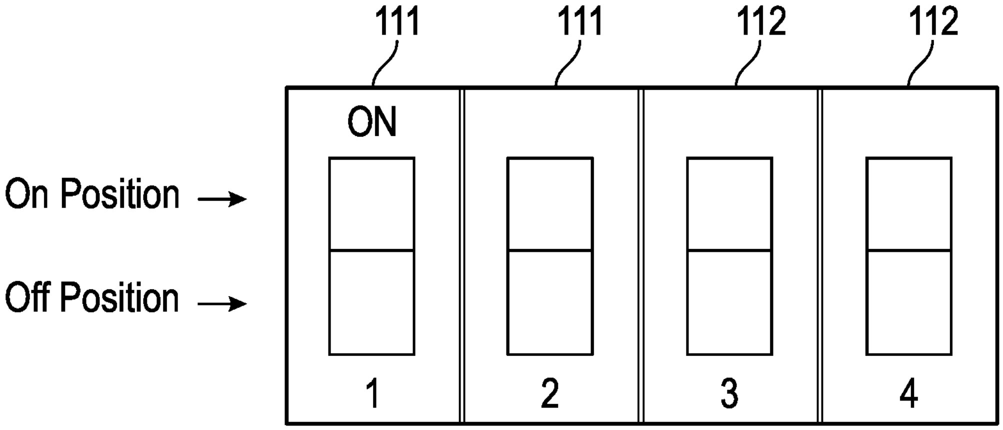
FIG. 4 shows a front view of a timing control and configuration control according to the first illustrated embodiment.

FIG. 4 shows a front view of the programmable timing control (112) and the programmable configuration control (111) according to the first illustrated embodiment. The programmable timing control and configuration control each comprise two switches for setting a power configuration and timing for the power distribution box. Each of the switches comprises an on position and an off position. Two switches allow for a total of four configurations (on/on, on/off, off/on, off/off). In some embodiments, the programmable timing control and the programmable configuration control are accessible only from inside the housing (101) of the power distribution box (100). In other embodiments, the programmable timing control and the programmable configuration control are externally accessible to the housing. External accessibility can include mechanical access and/or wireless access.

In some embodiments, the timing during each phase of the power configuration is static, having a same amount for each energized receptacle. In other embodiments, the timing differs between some or all of the various energized states.

Figure 5:
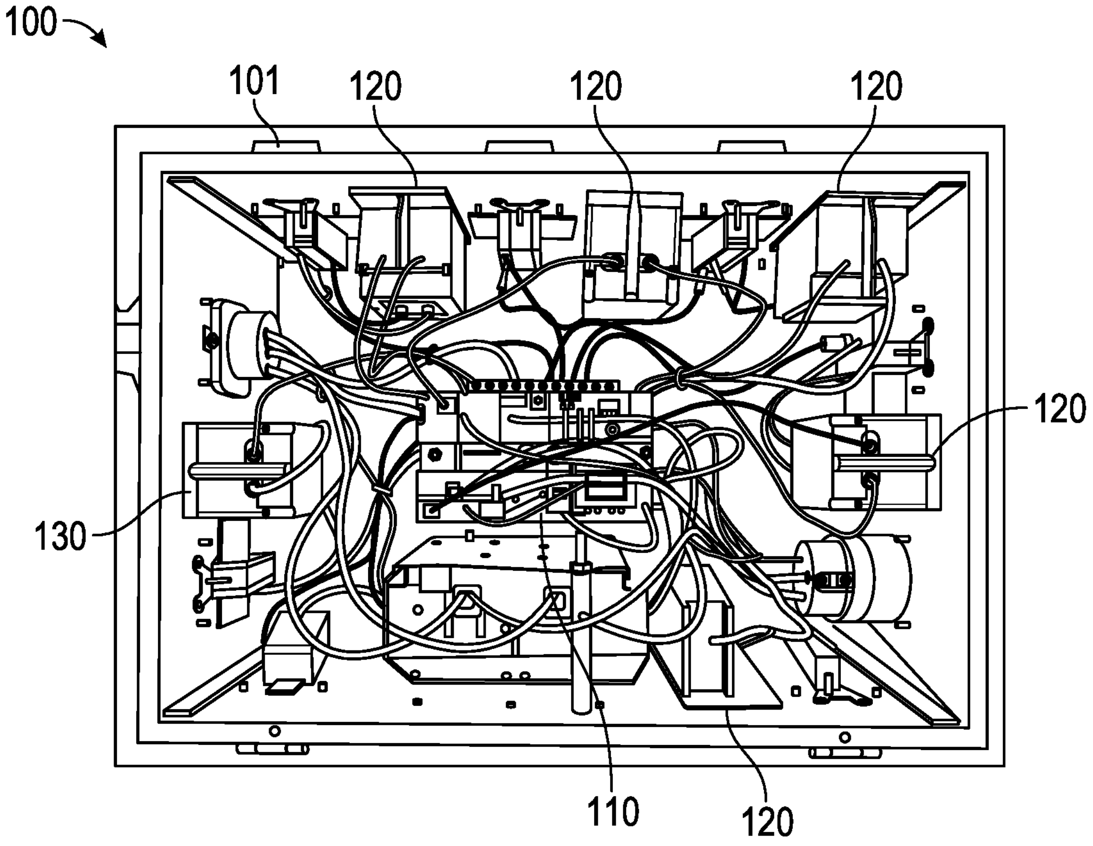
FIG. 5 shows a top view of the power distribution box according to the first illustrated embodiment.
Figure 6:
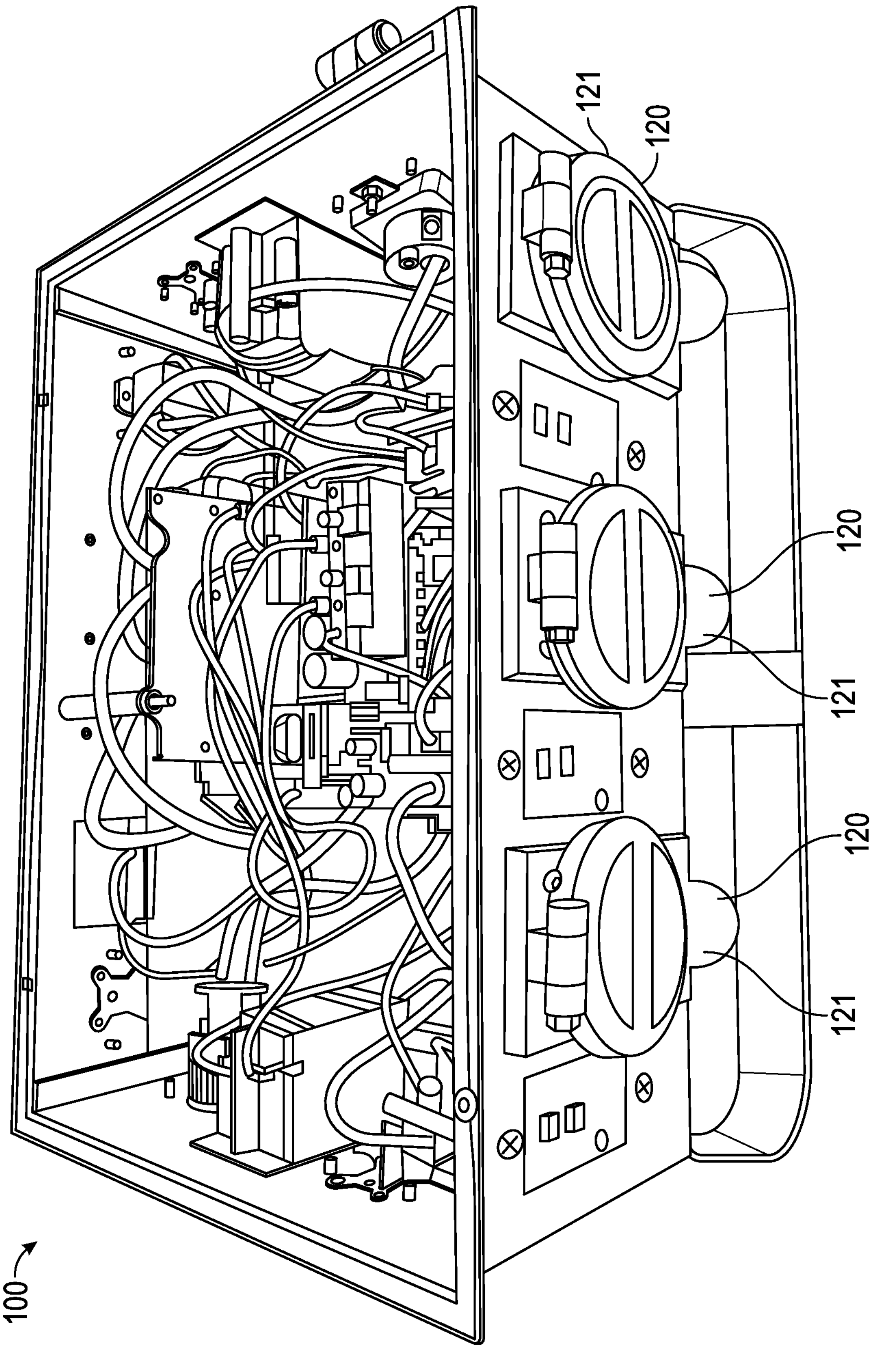
FIG. 6 shows a perspective view of the power distribution box according to the first illustrated embodiment.

FIGS. 5 and 6 show the power distribution box (100) according to the first illustrated embodiment. The power distribution box comprises a housing (101) having externally-accessible receptacles disposed on a periphery thereof. The externally-accessible receptacles include a continuous-powered receptacle (130) and a plurality of power-alternating receptacles (120). As shown, the power distribution box comprises only one continuous-powered receptacle. In other embodiments the power distribution box comprises more than one continuous-powered receptacle. A power switching module (110) is disposed within the housing and is configured to alternate states of each of the power-alternating receptacles. Each of the externally-accessible receptacles includes a receptacle cover (121) for protection from environmental factors including dust and moisture.

FEATURE LIST power distribution box (100)
housing (101)
power input (102)
circuit breaker (103)
power switching module (110)
programmable configuration control (111)
programmable timing control (112)
microcontroller (113)
power switching componentry (114)
power supply (115)
plurality of power-alternative receptacles (120)
receptacle cover (121)
continuous-powered receptacle (130)

What is claimed is:

1. A power distribution box, comprising:

a housing having a periphery;

one or more continuous-powered receptacles externally disposed on the periphery housing, wherein the one or more continuous-powered receptacles are continuously in an energized state during operation of the power distribution box;

a plurality of power-alternating receptacles externally disposed on the periphery of the housing, wherein each of the plurality of power-alternating receptacles is configured to independently alternate between the energized state and a de-energized state during operation of the power distribution box;

a power switching module encapsulated within the housing, the power switching module comprising:

a programmable configuration control configured to receive user programmable input for configuration of the plurality of power-alternating receptacles, a programmable timing control configured to receive user programmable input for timing of the plurality of power-alternating receptacles in both the energized state and the de-energized state;

power switching componentry configured to regulate both configuration and timing of the plurality of power-alternating receptacles based on the user programmable input for configuration and the user programmable input for timing, and a microcontroller electrically coupled to each of the programmable configuration control, the programmable timing control, and the power switching componentry such that the microcontroller is configured to receive signals from the programmable configuration control and the programmable timing control, the microcontroller further configured to send a signal to the power switching componentry to put each of the plurality of power-alternating receptacles into either the energized state or the de-energized state; and a power inlet disposed on the housing, the power inlet electrically coupled to each of the one or more continuous-powered receptacles and the plurality of power-alternating receptacles.

2. The power distribution box of claim 1, wherein at least two of the plurality of power-alternating receptacles are configured to change from the de-energized state to the energized state asynchronously.

3. The power distribution box of claim 1, wherein the power switching module is configured to rotate power between the plurality of power-alternating receptacles such that a number of energized power-alternating receptacles is always less than a total number of power-alternating receptacles during operation of the power distribution box.

4. The power distribution box of claim 1, the plurality of power-alternating receptacles comprising a first receptacle and a second receptacle, wherein the power switching module is configured to energize the first receptacle into the energized state, and wherein the first receptacle precludes a simultaneous energization of the second receptacle.

5. The power distribution box of claim 1, wherein each of the power-alternating receptacles comprises a timing configuration designating a duration that each of the power-alternating receptacles remain in said energized state.

6. A power distribution box, comprising:

a housing having a periphery;

one or more continuous-powered receptacles disposed on the housing, wherein the one or more continuous-powered receptacles are continuously in an energized state during operation of the power distribution box;

a plurality of power-alternating receptacles disposed on the housing, wherein each of the plurality of power-alternating receptacles is configured to alternate between the energized state and a de-energized state during operation of the power distribution box, wherein each of the power-alternating receptacles comprises a timing configuration designating a duration that each of the power-alternating receptacles remain in said energized state; and a power switching module encapsulated within the housing, the power switching module configured to alternate the plurality of power-alternating receptacles between the energized state and the de-energized state, the power switching module further comprising:

a programmable configuration control configured to receive user programmable input for configuration of the plurality of power-alternating receptacles, a programmable timing control configured to receive user programmable input for timing of the plurality of power-alternating receptacles, power switching componentry configured to regulate both configuration and timing of the plurality of power-alternating receptacles based on the user programmable input for configuration and the user programmable input for timing, and a microcontroller electrically coupled to each of the programmable configuration control, the programmable timing control, and the power switching componentry such that the microcontroller is configured to receive signals from the programmable configuration control and the programmable timing control, the microcontroller further configured to send a signal to the power switching componentry to put each of the plurality of power-alternating receptacles into either the energized state or the de-energized state.

7. The power distribution box of claim 6, further comprising a power inlet disposed on the housing, the power inlet electrically coupled to each of the one or more continuous-powered receptacles and the plurality of power-alternating receptacles.

8. The power distribution box of claim 6, wherein at least one of the plurality of power-alternating receptacles is in the de-energized state at any instance.

9. The power distribution box of claim 7, wherein at least one of the plurality of power-alternating receptacles is in the energized state at any instance.

10. The power distribution box of claim 6, wherein each of the plurality of power-alternating receptacles is configured to independently alternate between the energized state and the de-energized state.

11. The power distribution box of claim 6, the power switching module further comprising a programmable configuration control and a programmable timing control, the programmable configuration control comprising a first actuator and a second actuator, and the programmable timing control comprising a third actuator and a fourth actuator.

12. The power distribution box of claim 6, wherein configuration and timing of the plurality of power-alternating receptacles is programmable by a user.

13. The power distribution box of claim 6, wherein each of the one or more continuous-powered receptacles and the plurality of power alternating receptacles are disposed on the periphery of the housing.

14. The power distribution box of claim 6, wherein at least two of the plurality of power-alternating receptacles are configured to change from the de-energized state to the energized state asynchronously.

15. The power distribution box of claim 6, wherein the power switching module is configured to rotate power between the plurality of power-alternating receptacles such that a number of energized power-alternating receptacles is always less than a total number of power-alternating receptacles during operation of the power distribution box.

16. The power distribution box of claim 6, the plurality of power alternating receptacles comprising a first receptacle and a second receptacle, wherein the power switching module is configured to energize the first receptacle into the energized state, and wherein the first receptacle precludes a simultaneous energization of the second receptacle.

* * * * *